United States Patent
Xiao

(10) Patent No.: US 8,086,244 B2
(45) Date of Patent: Dec. 27, 2011

(54) MEASUREMENT CONTROL BASED ON RBS PROCESSING CAPABILITY

(75) Inventor: Lei Xiao, Beijing (CN)

(73) Assignee: Telefonaktiebolaget LM Ericsson (publ), Stockholm (DE)

( * ) Notice: Subject to any disclaimer, the term of this patent is extended or adjusted under 35 U.S.C. 154(b) by 1030 days.

(21) Appl. No.: 11/968,273

(22) Filed: Jan. 2, 2008

(65) Prior Publication Data

US 2009/0069007 A1 Mar. 12, 2009

Related U.S. Application Data

(60) Provisional application No. 60/971,484, filed on Sep. 11, 2007, provisional application No. 60/975,044, filed on Sep. 25, 2007.

(51) Int. Cl.
*H04W 72/00* (2009.01)

(52) U.S. Cl. ............... 455/453; 455/432.1; 455/436; 455/442; 455/446; 455/452.2; 370/331; 370/332; 370/333; 370/334

(58) Field of Classification Search .......... 455/434–453; 370/330–333
See application file for complete search history.

(56) References Cited

U.S. PATENT DOCUMENTS

2007/0081468 A1* 4/2007 Timus ......................... 370/252

FOREIGN PATENT DOCUMENTS

| GB | 2 395 398 A | 5/2004 |
|---|---|---|
| WO | 02/073887 A2 | 9/2002 |

OTHER PUBLICATIONS

3rd Generation Partnership Project; Technical Specification Group Radio Access Network; Physical layer; Measurements (TDD) (Release 7), Mar. 2007, pp. 1-27.
3rd Generation Partnership Project; Technical Specification Group Radio Access Network; UTRAN Iub interface NBAP signaling (Release 4), Sep. 2004, pp. 1-564.
3GPP TS 25.433 V7.5.0 (Jun. 2007) Technical Specification: 3rd Generation Partnership Project; Technical Specification Group Radio Access Network; UTRAN Iub interface Node B Application Part (NBAP) signalling (Release 7), pp. 1-962.
International Preliminary Report on Patentability mailed Mar. 16, 2010 (13 pages).

* cited by examiner

*Primary Examiner* — Dai A Phuong
(74) *Attorney, Agent, or Firm* — Nixon & Vanderhye P.C.

(57) ABSTRACT

A telecommunication system includes one or more radio access network controllers and one or more radio base stations. A radio access network controller supervises the operation of a radio base station. To facilitate the supervision process, the radio access network controller receives a measurement capacity report from the radio base station and determines measurement control parameters specifying reporting requirements of the radio base station. The measurement control parameters are continually adjusted so that the capacity of the radio base station is not exceeded. Also, the capacity of the radio network controller is also considered in determining the measurement control parameters.

25 Claims, 5 Drawing Sheets

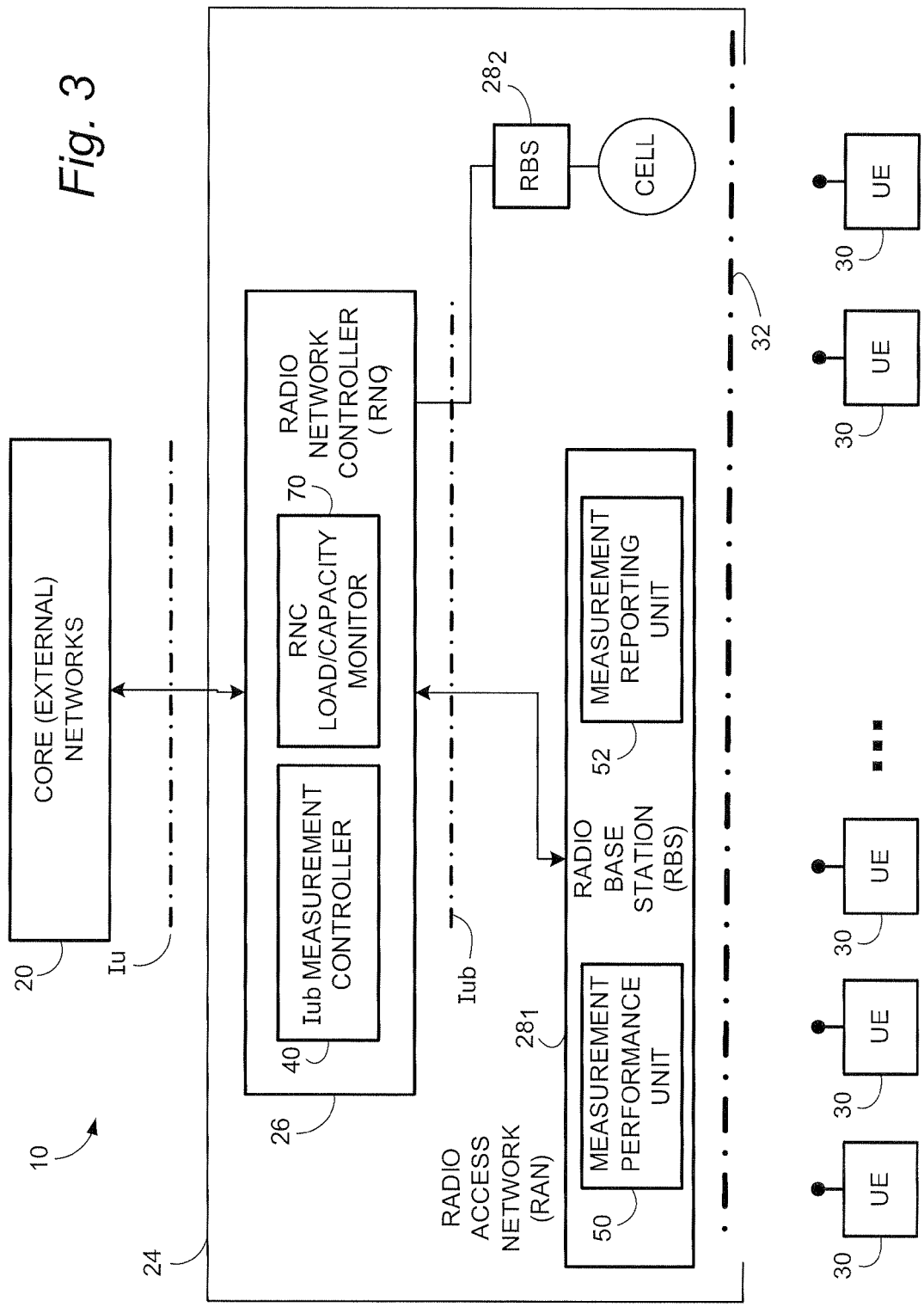

MEASUREMENT CONTROL BASED ON RBS PROCESSING CAPABILITY

RELATED APPLICATION

This application is related to U.S. provisional patent application 60/971,484 entitled "MEASUREMENT CONTROL BASED ON RBS PROCESSING CAPABILITY", filed Sep. 11, 2007 and related to provisional patent application 60/975,044 also entitled "MEASUREMENT CONTROL BASED ON RBS PROCESSING CAPABILITY" filed Sep. 25, 2007, both of which are incorporated herein by reference in their entirety.

TECHNICAL FIELD

The technical field of this disclosure generally relates to telecommunications, and particularly to the operation of a radio access network (RAN), and more particularly to the reporting of measurements between nodes of the radio access network.

BACKGROUND

In a typical cellular radio system, wireless user equipments (UEs) communicate via a radio access network to one or more core networks. The wireless user equipments (or simply user equipments) can be mobile stations, mobile terminals, or wireless terminals/stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipments can be fixed wireless devices, e.g., fixed cellular devices/terminals which are part of a wireless local loop or the like.

The radio access network covers a geographical area which is divided into cell areas, with each cell area being served by a radio base station (RBS) (also known as a base station, NodeB, or Node_B, for example). A cell is a geographical area where radio coverage is provided by the radio base station equipment at a radio base station site. Each cell is identified by a unique identity, which is broadcast as system information in the cell. The radio base stations communicate over the air interface with the user equipments within the range of the radio base stations. In the radio access network, several radio base stations are typically connected (e.g., by landlines or microwave) to a radio network controller (RNC). The radio network controller, also sometimes referred to as a base station controller (BSC), supervises and coordinates various activities of the radio base stations connected to the radio network controller. The radio network controllers are typically connected to one or more core networks. The core network has two service domains, with an radio network controller having an interface to both of these domains.

One example of the radio access network is the Universal Mobile Telecommunications System (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to the user equipments. The Third Generation Partnership Project (3GPP) has undertaken to evolve further the UTRAN and GSM-based radio access network technologies.

There are several interfaces of interest in the UTRAN. The interface between the radio network controllers and the core network(s) is termed the "Iu" interface. The interface between a radio network controller and its radio base stations is termed the "Iub" interface. The interface between the user equipments and the radio base stations is known as the "air interface", the "radio interface" or the "Uu interface". In some instances, a connection involves both a Source or Serving radio network controller (SRNC) and a target or drift radio network controller (DRNC), with the SRNC controlling the connection but with one or more diversity legs of the connection being handled by the DRNC. An Inter-RNC transport link can be utilized for the transport of control and data signals between the SRNC and the DRNC, and can be either a direct link or a logical link. An interface between radio network controllers (e.g., between a SRNC and a DRNC) is termed the "Iur" interface.

The radio network controller controls the UTRAN. In fulfilling its control role, the radio network controller manages resources of the UTRAN. Such resources managed by the radio network controller include (among others) the downlink (DL) power transmitted by the radio base stations, the uplink (UL) interference perceived by the radio base stations, and the hardware situated at the radio base stations.

In some 3GPP systems (e.g., either WCDMA or TD-SCDMA), the radio network controller will require the radio base station to perform some measurements and report the measurement results back to the radio network controller through the Iub interface. The radio network controller will likely initiate and control the reporting process, and thus controls such information/parameters as measurement types, the reporting periods, and so on. Based on the measurement results received from the radio base station, the radio network controller can better evaluate handover, resource allocation or other functions.

There are many potential types of measurements and a potentially large range for the reporting periods. Normally, it is advantageous for the radio network controller to receive measurement results as frequently as possible to improve evaluation accuracy and response in time. However, different types of radio base stations, especially from different vendors, have differing processing power for the Iub signaling, and thus have differing measurement report capabilities. So an improper setting of measurement control parameters by a radio network controller could cause a particular radio base station to be overloaded by the reporting requirements to the radio network controller. When the radio base station may be overwhelmed by the radio network controller measurement reporting requirements, activities (such as an interoperability test (IOT)) between the radio network controller and the radio base station will be very difficult.

Moreover, in view of its own internal structure and/or current processing load, it is possible that the radio network controller may have its own limitation as to how many measurements it can handle, e.g., how many measurement reports it can effectively receive from the radio base stations. Thus, it is possible that an improper setting of measurement control parameters by the radio network controller could cause the radio network controller itself to be overloaded by the reporting requirement which it imposes on the radio base stations for reporting to the radio network controller.

SUMMARY

An example method to control measurement reports is presented. In the method, a measurement capacity report from a radio base station (28) of the telecommunication system is received. Based on the measurement capacity report, one or more measurement control parameters of the radio base station are initially determined and sent to the radio base station. One or more measurement reports from the radio base station are received. Based on the one or more measurement reports, the one or more measurement control parameters are adjusted and sent to the radio base station. The one or more measurement control parameters specify reporting requirements from the radio base station. The reporting requirements are such that a capacity of the radio base station is not exceeded in satisfying the reporting requirements. Also the measurement control parameters are continually adjusted and sent to the radio base station based on further measurement reports from the radio base station.

The measurement capacity report includes types of measurements that can be made and reported including one or more common measurements, or one or more dedicated measurements, or both. A common measurement is measurements on common resources in a radio base station. An example of a common measurement is an interference measurement. A dedicated measurement is measurements on dedicated resources in the radio base station such as a receiving power measurement.

An example act of adjusting the measurement control parameters is disclosed. In the act, a change in a measurement is determined. The measurement is included in the measurement reports from the radio base station. It is determined whether the change of the measurement exceeds a preset limit. If so, the measurement control parameters related to the measurement is adjusted to increase a reporting frequency of the measurement. If the adjustment will exceed the capacity of the radio base station, the measurement control parameters are readjusted such that the readjusted measurement control parameters will not exceed the capacity of the radio base station. Measurement control parameters not related to the measurement are adjusted during readjustment. An example of a measurement is a state of a radio frequency (RF) channel used for communication between a user equipment and the radio base station.

In addition to the capacity of the radio base station, a capacity of the radio network controller, which supervises activities of the radio base station, is considered in initially determining and adjusting the one or more measurement control parameters of the radio base station such that the capacity of the a radio network controller is not exceeded.

There can be a plurality of radio base stations and the method to control measurement reports can be performed for each radio base station. Further, the capacity of the radio network controller is also considered when there are multiple radio base stations.

An example radio network controller of a telecommunication system is disclosed. The radio network controller includes an Iub interface and an Iub measurement controller. The Iub interface is configured to receive a measurement capacity report from a radio base station of the telecommunication system, and the Iub measurement controller configured to initially determine one or more measurement control parameters of the radio base station based on the measurement capacity report. The Iub interface sends the initially determined one or more measurement control parameters to the radio base station and receives one or more measurement reports from the radio base station. The Iub measurement controller adjusts the one or more measurement control parameters based on the one or more measurement reports from the radio base station, and the Iub interface is sends the adjusted one or more measurement control parameters command to the radio base station.

The one or more measurement control parameters specify reporting requirements from the radio base station. The reporting requirements are such that a capacity of the radio base station is not exceeded in satisfying the reporting requirements. Also the measurement control parameters are continually adjusted and sent to the radio base station based on further measurement reports from the radio base station.

The Iub interface and the Iub measurement controller cooperate to repeatedly receive the one or more measurement reports from the radio base station, adjust the one or more measurement control parameters based on the one or more measurement reports from the radio base station, and to send the adjusted one or more measurement control parameters to the radio base station.

An example embodiment of the Iub measurement controller adjusts the measurement control parameters as follows. A change of a measurement included in the one or more measurement reports is determined. If the measurement change exceeds a preset limit, one or more measurement control parameters related to the measurement are adjusted to increase a reporting frequency of the measurement. If the adjustment will exceed the capacity of the radio base station, then the measurement control parameters are readjusted such that the readjusted measurement control parameters will not exceed the capacity of the radio base station. In the readjustment, measurement control parameters not related to the measurement are adjusted.

A capacity of the radio network controller is considered when the Iub measurement controller initially determines or adjusts the one or more measurement control parameters of the radio base station such that the capacity of the a radio network controller is not exceeded. Multiple radio base stations are allowed and the measurement control parameters are determined and adjusted for each radio base station.

An example embodiment of a telecommunication system is disclosed. The telecommunication system includes one or more radio base stations and a radio network controller. Each radio base station is configured to send a measurement capacity report to the radio network controller. Each radio base station is also configured to send one or more measurement reports to the radio network controller based on one or more measurement control parameters received from the radio network controller. The radio network controller is configured to, for each radio base station, receive the measurement capacity report from the radio base station, initially determine the one or more measurement control parameters of the radio base station based on the measurement capacity report, send the initially determined one or more measurement control parameters to the base station node, receive one or more measurement reports from the radio base station, adjust the one or more measurement control parameters based on the one or more measurement reports, and send the adjusted one or more measurement control parameters command to the base station node.

The radio network controller is also configured to repeatedly receive the one or more measurement reports from the radio base station, adjust the one or more measurement control parameters based on the one or more measurement reports from the radio base station, and send the adjusted one or more measurement control parameters to the radio base station for each radio base station.

The radio network controller considers its own capacity when initially determining and when adjusting the one or more measurement control parameters of the one or more radio base stations such that the capacity of the a radio network controller is not exceeded.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 illustrates another embodiment of a telecommunications system; and

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
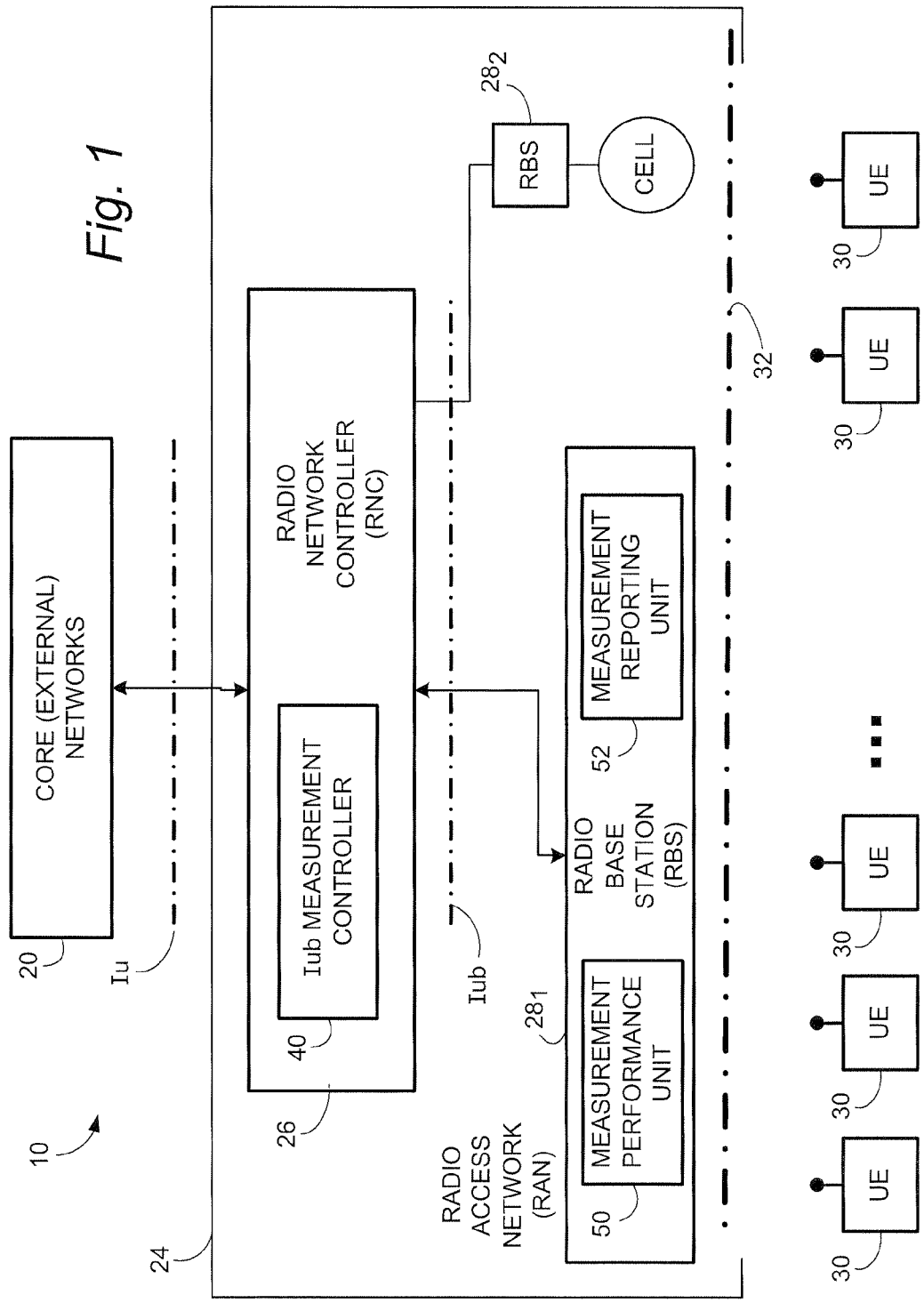
FIG. 1 illustrates an embodiment of a telecommunications system.

The present technology is described in the non-limiting, example context of a telecommunications system 10 shown in FIG. 1. The telecommunications system 10 connects to one or more core networks 20. The telecommunications system 10 comprises a radio access network (RAN) 24. The RAN 24 includes one or more radio network controllers (RNC) 26 and one or more radio base stations (RBS) 28.

A user equipment (UE), such as UE 30 shown in FIG. 1, communicates with one or more RBSs 28 over a radio or air interface 32. The UE 30 can be a mobile station such as a mobile telephone ("cellular" telephone) and laptop with mobile termination, and thus can be, for example, portable, pocket, hand-held, computer-included, or car-mounted mobile device which communicate voice and/or data with radio access network.

The RAN 24 shown in FIG. 1 can be, by way of non-limiting example, a UMTS Terrestrial Radio Access Network (UTRAN). In the UTRAN, the radio access is preferably based upon Wideband Code Division Multiple Access (WCDMA) with individual radio channels allocated using CDMA spreading codes. Other access methods may be employed.

The RNC 26 and the RBS 28 are respectively termed the radio network controller and the radio base station in view of the UTRAN example. It is contemplated that the term radio network controller and radio base station also encompass nodes having similar functionality for other types of radio access networks. A non-exhaustive list of other types of telecommunications systems that encompass other types of radio access networks include the following: Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; and the code division multiple access (CDMA) system described in EIA/TIA IS-95.

The RAN 24 is connected to core network 20 over an interface, such as the Iu interface for UTRAN. The core network 20 of FIG. 1 can comprise, among other things, a Mobile Switching Center (MSC) node, a Gateway MSC node (GMSC), a Gateway General Packet Radio Service (GPRS) support node (GGSN), and a Serving GPRS Support node (SGSN). Circuit switched (CS) network or packet switched (PS) network can be connected to core network 20.

For simplicity of explanation, the RAN 24 of FIG. 1 is shown with only one RNC 26. However, it is contemplated that multiple RNCs 26 may be provided with each RNC 26 being connected to one or more RBSs 28. Each RNC 26 can serve any number of RBSs 28. Further, the number of RBSs 28 served by each RNC 26 can differ.

Each RNC 26 can connect over an Iur interface to one or more other RNCs 26 in the RAN 24. The RNC 26 node communicates over the Iub interface with the RBS 28. The RBS 28 is sometimes also referred to as a node B or B-node. Each of the radio interface 32, the Iu interface, and the Iub interface are shown by dash-dot lines in FIG. 1.

As shown in FIG. 1, RNC 26 includes, among other constituents, an Iub measurement controller 40. The Iub measurement controller 40 can be a processor which is exclusively employed for the functions hereinafter described. The Iub measurement controller 40 can also be a processor which shares its processing power with such functions and other functions of a conventional RNC. A non-exhaustive list of other (not illustrated) constituent components of a typical RNC includes interfaces to the RBSs, interfaces to other RNC, interfaces to one or more core network nodes, diversity handling units (for combining and splitting operations), traffic control or traffic admission processors, and the like.

FIG. 1 illustrates a representative RBS 28 as including, in addition to its other constituents, a measurement performance unit 50 and a measurement reporting unit 52. The measurement performance unit 50 is capable of performing any number of measurements of interest to the RNC 26 such as receiving power. The RBS 28 typically includes other constituent units, such as transceivers and respective channels for processing radio transmissions both on the downlink (from the RBS to the UE) and on the uplink (from the UE to the RBS).

Figure 2:
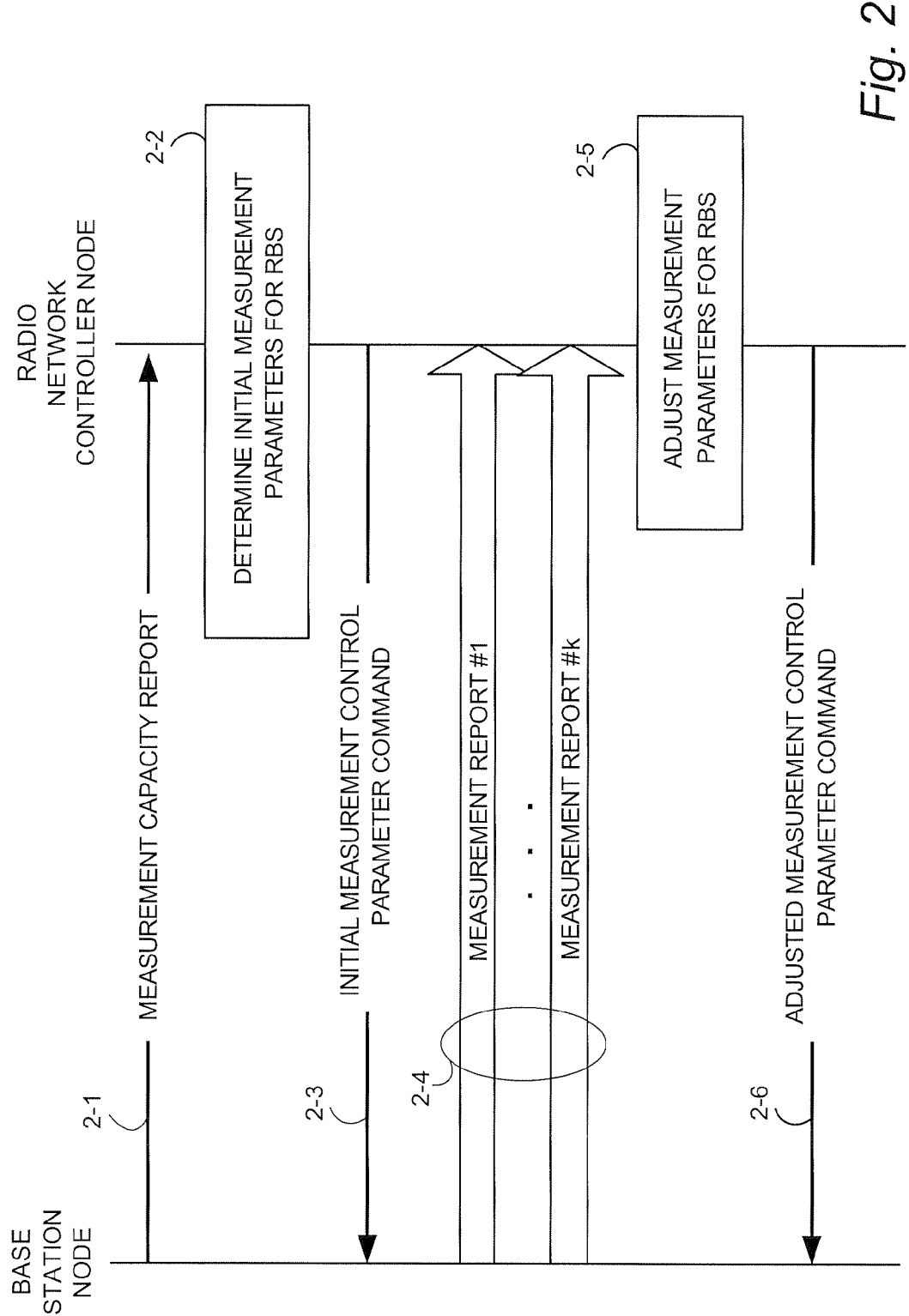
FIG. 2 illustrates an embodiment of a method for controlling measurement reports from nodes of a telecommunications system.

FIG. 2 illustrates example acts, steps, or events associated with the RNC 26 and the RBS 28 to control the RBS 28 measurement reports. In this example embodiment, the Iub measurement controller 40 of the RNC 26 and the measurement performance unit 50 and measurement reporting unit 52 of the RBS 28 carry out the example acts, steps, or events illustrated in FIG. 2.

In act 2-1, the RBS 28 provides a measurement capacity report to the RNC 26, for example, during a cell setup. The measurement capacity report apprises the RNC 26 of the capability of the RBS 28 to take various measurements and its capacity to report the measurements that are made. The measurement reporting unit 52 of the RBS 28 sends the measurement capacity report to the RNC 26.

The measurement capacity report can include the reporting frequency capability of the RBS 28 such as one thousand reports per second (1000 reports/sec). The measurement capacity report can also include the types of measurements that can be made and reported. These include common measurements such as the interference measurement, transmitted power measurements on common channels such as FACH and PCCPCH, and other kinds of common resource information.

The types of measurements can also include dedicated measurements. The dedicated measurements can be related to the UEs 30, such as receiving power for UE 30 and other kinds of dedicated resource specific measurements. The dedicated measurements can include a number of the UEs 30 (number of active users) being served by the RBS 28, states of radio frequency (RF) propagation channels being used to communicate with the UEs 30, and Signal to Interference Ratio (SIR) for those UEs (30), and Bit Error Rates (BER) measurements of dedicated channels among others.

In act 2-2, the Iub measurement controller 40 of the RNC 26 initially determines one or more measurement control parameters for the RBS 28 based on the measurement capacity of the RBS 28 as reported in the measurement capacity report. The measurement control parameters specify what measurements are to be reported by the RBS 28 to the RNC 26 and how frequent the reports should be made. That is, the measurement control parameters specify the reporting requirements of the RBS 28.

As an example, the measurement control parameters may specify that the RBS 28 should report 20 times/sec a noise level experienced by the RBS 28, report 30 times/sec the state of the RF propagation channel for each UE 30, report handoff of a UE 30 as the event occurs, etc. The measurement capacity report from the RBS 28 is considered in initially determining the measurement control parameters such that the capacity of the RBS 28 is not exceeded. That is, the RBS 28 will not be overloaded to satisfy the reporting requests of the measurement control parameters.

The measurement control parameters can be captured in a measurement control parameter command and the measurement control parameter command can be sent to the RBS 28 from the RNC 26 in act 2-3, for example, through a measurement request message which includes measurement period and so on to the RBS 28.

In acts 2-4 of FIG. 2, the RNC 26, and the Iub measurement controller 40 in particular, receives one or more measurement reports from the RBS 28 (such as from the measurement reporting unit 52) in accordance with the initial measurement control parameters. Optionally, the RNC 26 may verify whether the measurement reports are in accordance with the measurement control parameters and take remedial actions in case they are not in accordance.

As reflected in act 2-5, the Iub measurement controller 40 dynamically adjusts the measurement control parameters for the RBS 28 based on the measurement reports from the RBS 28. The adjusted measurement control parameters are sent to the RBS 28 in act 2-6 as an adjusted measurement control parameter command. Again, the measurement capacity report is considered in adjusting the measurement control parameters such that the capacity of the RBS 28 is not exceeded in satisfying the reporting requirements reflected in the adjusted measurement control parameters.

Figure 2A:
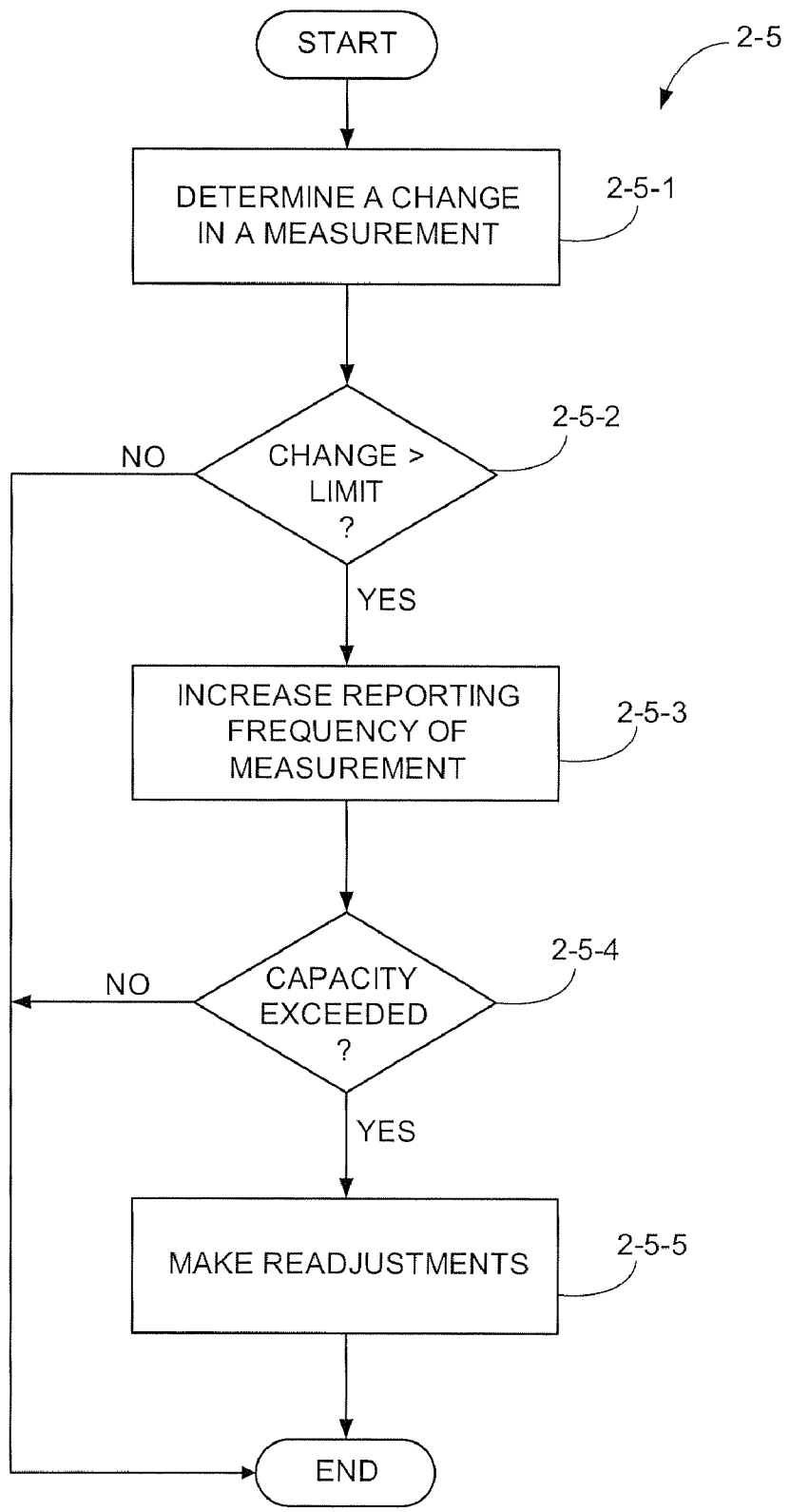
FIG. 2A illustrates an example act of dynamically adjusting measurement control parameters of a radio base station.

As an example of a dynamic adjustment performed in act 2-5 is illustrated in FIG. 2A. In act 2-5-1, the RNC 26 determines a change in a measurement. The measurement is included in the measurement reports from the RBS 28. An example of the measurement is a state of a radio frequency (RF) propagation channel for an active user (a first UE 30). The RF propagation channel is a channel used for communication between the first UE 30 and the RBS 28.

In act 2-5-2, the RNC 26 determines whether the change of the measurement is greater than a preset limit. In this example, it is determined whether the communication channel is changing rapidly, such as when the user is moving rapidly in an automobile.

If the change in the measurement is greater than the preset limit, then Iub measurement controller 40 (of the RNC 26) can adjust the measurement control parameters in act 2-5-3 so that the measurements related to measurement can be made and reported more frequently by the RBS 28. In this example, measurements related to the state of the communication channel for the first UE 30 can be reported more frequently such as from 10 times/sec to 20 times/sec. This allows the service to this particular active user to be maintained at a reasonable level by making decisions on handover evaluation, dynamic channel allocation evaluation or other decisions in a timely manner.

Such increase in the reporting requirements may overload the capacity of the RBS 28. To prevent overload, The RNC determines in act 2-5-4 whether the capacity of the RBS 28 will be exceeded by the reporting requirements reflected in the adjusted measurement control parameters. If so, other adjustments to the measurement control parameters are made in act 2-5-5 so that the RBS 28 will not be overloaded. In this example, a reporting frequency for another active user (a second UE 30) can be reduced to compensate. It may be that the RF propagation channel for the second UE 30) is changing relatively slowly such as when the user walking or is stationary. The frequency of reports may be slowed for the second UE 30 without sacrificing much performance.

By dynamically adjusting the measurement control parameters as described above for each of the one or more UEs 30, the RNC 26 can avoid overloading the RBS 28 while optimizing the performance of the system. In addition to the dedicated measurements, the measurement control parameters of one or more common measurements can be adjusted as well. For example, the interference measurement can be less frequent if it does not change too much.

The acts 2-4, 2-5 and 2-6 in FIG. 2 can be repeated many times to continually adjust the performance of the system. Also in FIG. 2, it is shown that a number of measurement reports (in act 2-4) is k before measurement control parameters are adjusted (in act 2-5). It is contemplated that the number k can change between one repetition to another of the acts 2-4, 2-5 and 2-6.

In the above example, the measurement is related to the state of the communication channel and the preset limit can be expressed as n decibels/sec, where "n" is some number. There can be other measurements such as noise level experienced by the radio base station 28. For each measurement, it is contemplated that the preset limit can be tailored. It is also contemplated that the preset limit for each measurement may be adjusted individually as desired.

FIG. 3 shows another embodiment of a telecommunications system in which the present technology can be advantageously utilized. This embodiment is similar to the embodiment of FIG. 1. But in addition, the RNC 26 also includes a RNC load/capacity monitor 70. The RNC load/capacity monitor 70 can measure the load on the RNC 26 itself and also is aware of the processing capabilities of the RNC 26.

The RNC load/capacity monitor 70 communicates with the Iub measurement controller 40 so that the RNC 26 can adjust the measurement control parameters that is sent to the RBS 28 to take into consideration, not only the capabilities of RBS 28, but also the capacities of the RNC 26 itself.

Figure 4:
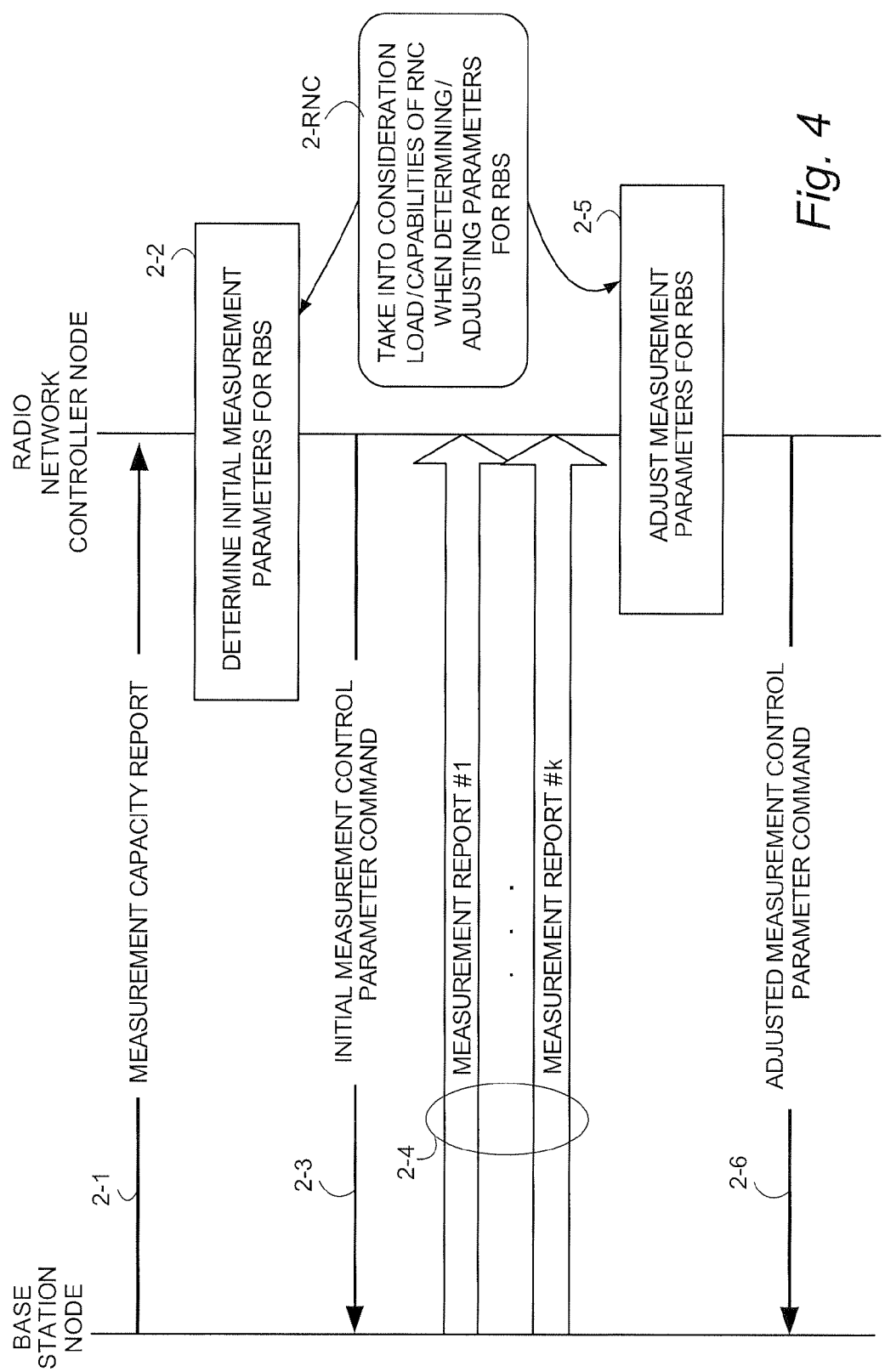
FIG. 4 illustrates another embodiment of a method for controlling measurement reports from nodes of a telecommunications system.

FIG. 4 illustrates example acts, steps, or events associated with the RNC 26 and the RBS 28 to control the RBS 28 measurement reports related to the radio network controller-conscious embodiment of FIG. 3. From the RBS's 28 perspective, the acts illustrated in FIG. 4 are similar to the acts illustrated in FIG. 2. That is, the RBS 28 reports the measurement capacity of the RBS 28 (act 2-1), receives the initial measurement control parameters (act 2-3), provides measurement reports (act 2-4) and receives the adjusted measurement control parameters (act 2-6) in manner similar as described with respect to FIG. 2.

From the RNC's 26 perspective, the acts are similar as well. The RNC 26 receives the measurement capacity of the RBS 28 (act 2-1), determines and sends the initial measurement control parameters (acts 2-2 and 2-3), receives measurement reports (acts 2-4) and adjusts and sends the adjusted measurement control parameters (acts 2-5 and 2-6) in manner similar as described with respect to FIG. 2.

However, in addition to the factors related to the RBS 26 and the UE 30, the capacities/capabilities of the RNC 26 are also considered when determining the initial measurement control parameters (act 2-2) and when adjusting the measurement control parameters (act 2-5) in FIG. 4. That is, the measurement control parameters are dynamically adjusted to avoid overloading of RNC 26 as well as to avoid overloading of the RBS 28.

One advantage is that the need to reset the RNC 26 and/or the RBS 28 is minimized. Another advantage is that such technology is very useful for interoperability test (IOT) between a RNC 26 and a RBS 28 that are from different vendors. In this case, the processing ability is not known to each other so a specific parameter to indicate such ability in open interface, Iub, is very beneficial.

Thus, the technology introduces a parameter from the RBS 28 to the RNC 26 to indicate its reporting capability so that the RNC 26 can then adjust measurement control parameters accordingly. The Iub measurement controller 40 can include an algorithm suited to match the abilities of different RBSs 28.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method step in the present disclosure is intended to be dedicated to the public.

What is claimed is:

1. A method at or on behalf of a radio network controller to control measurement reports, the method comprising:
   receiving a measurement capacity report from a radio base station of the telecommunication system, the measurement capacity report comprising a capacity of the radio base station to report on measurements;
   initially determining one or more measurement control parameters of the radio base station based on the measurement capacity report;
   sending the initially determined one or more measurement control parameters to the radio base station;
   receiving one or more measurement reports from the radio base station;
   determining a change of a measurement included in the one or more measurement reports;
   determining whether the change of the measurement exceeds a preset limit;
   adjusting one or more measurement control parameters related to the measurement to increase a reporting frequency of the measurement when it is determined that the change exceeds the preset limit;
   determining whether the adjustment to the measurement control parameters will exceed the capacity of the radio base station;
   readjusting the measurement control parameters such that the readjusted measurement control parameters will not exceed the capacity of the radio base station; and
   sending the adjusted one or more measurement control parameters command to the radio base station,
   wherein both the initially determined and the adjusted one or more measurement control parameters specify reporting requirements from the radio base station and are such that the capacity of the radio base station is not exceeded in satisfying the reporting requirements.

2. The method of claim 1, wherein the acts of receiving the one or more measurement reports from the radio base station, adjusting the one or more measurement control parameters based on the one or more measurement reports from the radio base station, and sending the adjusted one or more measurement control parameters to the radio base station are repeated.

3. The method of claim 1, wherein
the measurement capacity report includes types of measurements that can be made and reported by the radio base station including one or more common measurements, or one or more dedicated measurements, or both,
the common measurements are measurements on common resources of the radio base station, and
the dedicated measurements are measurements on dedicated resources of the radio base station.

4. The method of claim 3, wherein
the common measurement includes transmitted power measurements for one or more common channels including FACH and PCCPCH, and
the dedicated measurement includes one or more of SIR and BER measurements of dedicated channels.

5. The method of claim 1, wherein the measurement includes a state of a radio frequency (RF) channel used for communication between a user equipment node and the radio base station.

6. The method of claim 1, wherein in the act of readjusting the measurement control parameters, measurement control parameters not related to the measurement are adjusted.

7. The method of claim 1, wherein a capacity of the radio network controller, which supervises activities of the radio base station, is considered in the act of initially determining the one or more measurement control parameters and the act of adjusting the one or more measurement control parameters of the radio base station are performed such that the capacity of the radio network controller is not exceeded.

8. The method of claim 1,
wherein the radio base station is one of a plurality of radio base stations, and
wherein all acts of claim 1 are performed for each of the plurality of radio base stations.

9. The method of claim 8, wherein a capacity of the radio network controller, which supervises activities of the plurality of radio base stations, is considered in the act of initially determining the one or more measurement control parameters and the act of adjusting the one or more measurement control parameters of the radio base station are performed such that the capacity of the radio network controller is not exceeded.

10. The method of claim 1, wherein the measurement capacity report includes a reporting frequency capability of the radio base station.

11. A radio network controller of a telecommunication system, comprising:
an Iub interface configured to receive a measurement capacity report from a radio base station of the telecommunication system, the measurement capacity report comprising a capacity of the radio base station to report on measurements; and
an Iub measurement controller configured to initially determine one or more measurement control parameters of the radio base station based on the measurement capacity report,
wherein the Iub interface is configured to send the initially determined one or more measurement control parameters to the radio base station and to receive one or more measurement reports from the radio base station,
wherein the Iub measurement controller is configured to determine a change of a measurement included in the one or more measurement reports,
determine whether the change of the measurement exceeds a preset limit,
adjust one or more measurement control parameters related to the measurement to increase a reporting frequency of the measurement when it is determined that the change exceeds the preset limit,
determine whether the adjustment to the measurement control parameters will exceed the capacity of the radio base station, and
readjust the measurement control parameters such that the readjusted measurement control parameters will not exceed the capacity of the radio base station,
wherein the Iub interface is configured to send the adjusted one or more measurement control parameters command to the radio base station, and
wherein both the initially determined and the adjusted one or more measurement control parameters specify reporting requirements from the radio base station and are such that the capacity of the radio base station is not exceeded in satisfying the reporting requirements.

12. The radio network controller of claim 11,
wherein the Iub interface is configured to repeatedly receive the one or more measurement reports from the radio base station and to repeatedly send the adjusted one or more measurement control parameters to the radio base station, and
wherein the Iub measurement controller is configured to repeatedly adjust the one or more measurement control parameters based on the one or more measurement reports from the radio base station.

13. The radio network controller of claim 11, wherein
the measurement capacity report includes types of measurements that can be made and reported by the radio base station including one or more common measurements, or one or more dedicated measurements, or both,
the common measurements are measurements on common resources of the radio base station, and
the dedicated measurements are measurements on dedicated resources of the radio base station.

14. The radio network controller of claim 13, wherein
the common measurement includes transmitted power measurements for one or more common channels including FACH and PCCPCH, and
the dedicated measurement includes one or more of SIR and BER measurements of dedicated channels.

15. The radio network controller of claim 11, wherein the measurement includes a state of a radio frequency (RF) channel used for communication between a user equipment node and the radio base station.

16. The radio network controller of claim 11, wherein the Iub measurement controller is configured to readjust measurement control parameters not related to the measurement.

17. The radio network controller of claim 11, wherein the Iub measurement controller is configured to consider a capacity of the radio network controller when initially determining the one or more measurement control parameters and when adjusting the one or more measurement control parameters of the radio base station such that the capacity of the radio network controller is not exceeded.

18. The radio network controller of claim 11,
wherein the radio base station is one of a plurality of radio base stations, and
wherein the Iub interface is configured to interface with each radio base station, and
wherein the Iub measurement controller is configured to determine and adjust measurement control parameters for each radio base station.

19. The radio network controller of claim 18, wherein the Iub measurement controller is configured to consider a capacity of the radio network controller when initially determining the one or more measurement control parameters and when adjusting the one or more measurement control parameters of the plurality of radio base stations such that the capacity of the radio network controller is not exceeded.

20. The radio network controller of claim 11, wherein the measurement capacity report includes a reporting frequency capability of the radio base station.

21. A telecommunication system, comprising:
one or more radio base stations each configured
to send a measurement capacity report to a radio network controller, the measurement capacity report comprising a capacity of the radio base station to report on measurements, and
to send one or more measurement reports to the radio network controller based on one or more measurement control parameters received from the radio network controller, and
the radio network controller configured to, for each radio base station,
receive the measurement capacity report from the radio base station,
initially determine the one or more measurement control parameters of the radio base station based on the measurement capacity report,
send the initially determined one or more measurement control parameters to the radio base station,
receive the one or more measurement reports from the radio base station,
determine a change of a measurement included in the one or more measurement reports,
determine whether the change of the measurement exceeds a preset limit,
adjust one or more measurement control parameters related to the measurement to increase a reporting frequency of the measurement when it is determined that the change exceeds the preset limit,
determine whether the adjustment to the measurement control parameters will exceed the capacity of the RBS,
readjust the measurement control parameters such that the readjusted measurement control parameters will not exceed the capacity of the RBS, and
send the adjusted one or more measurement control parameters command to the radio base station,
wherein the measurement capacity report from each radio base station includes types of measurements that can be made and reported by the radio base station including one or more common measurements, or one or more dedicated measurements, or both,
wherein the common measurements are measurements on common resources of the radio base station, and
wherein the dedicated measurements are measurements on dedicated resources of the radio base station,
wherein both the initially determined and the adjusted one or more measurement control parameters for each radio base station specify reporting requirements from the radio base station and are such that the capacity of the radio base station is not exceeded in satisfying the reporting requirements.

22. The telecommunication system of claim 21, wherein the radio network controller is configured to repeatedly receive the one or more measurement reports from the radio base station, adjust the one or more measurement control parameters based on the one or more measurement reports from the radio base station, and send the adjusted one or more measurement control parameters to the radio base station for each radio base station.

23. The telecommunication system of claim 21, wherein the measurement includes a state of a radio frequency (RF) channel used for communication between a user equipment node and the radio base station.

24. The telecommunication system of claim 21, wherein the radio network controller is configured to consider a capacity of the radio network controller when initially determining the one or more measurement control parameters and when adjusting the one or more measurement control parameters of the one or more radio base stations such that the capacity of the radio network controller is not exceeded.

25. The telecommunication system of claim 21, wherein the measurement capacity report includes a reporting frequency capability of the radio base station.

* * * * *

UNITED STATES PATENT AND TRADEMARK OFFICE
CERTIFICATE OF CORRECTION

PATENT NO.         : 8,086,244 B2                                        Page 1 of 1
APPLICATION NO.    : 11/968273
DATED              : December 27, 2011
INVENTOR(S)        : Xiao It is certified that error appears in the above-identified patent and that said Letters Patent is hereby corrected as shown below:

On the Cover Page, item (73), under "Assignee", in Column 1, Line 2, delete "(DE)" and insert -- (SE) --, therefor.

In Column 12, Line 47, in Claim 16, delete "Tub" and insert -- Iub --, therefor.

Signed and Sealed this
Tenth Day of April, 2012

David J. Kappos
*Director of the United States Patent and Trademark Office*